United States Patent
Lin et al.

(10) Patent No.: US 8,559,322 B2
(45) Date of Patent: Oct. 15, 2013

(54) LINK STATE DETECTION METHOD AND SYSTEM

(75) Inventors: Yun Lin, Shenzhen (CN); Xinjian Wang, Shenzhen (CN); Xiangfeng Qu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 565 days.

(21) Appl. No.: 12/794,522

(22) Filed: Jun. 4, 2010

(65) Prior Publication Data

US 2010/0246431 A1 Sep. 30, 2010

Related U.S. Application Data

(63) Continuation of application No. PCT/CN2008/073342, filed on Dec. 4, 2008.

(30) Foreign Application Priority Data

Dec. 6, 2007 (CN) .......................... 2007 1 0195538

(51) Int. Cl.
*H04J 1/16* (2006.01)
(52) U.S. Cl.
USPC ........... 370/252; 370/241; 370/351; 370/356; 370/360
(58) Field of Classification Search
USPC .......... 370/241, 248, 250, 252, 351, 356, 360
See application file for complete search history.

(56) References Cited

U.S. PATENT DOCUMENTS

2004/0028060 A1 2/2004 Kang
2004/0162113 A1* 8/2004 Oomoto et al. ............... 455/560
2005/0201380 A1* 9/2005 Saleh et al. ................ 370/395.2
2005/0213596 A1 9/2005 Mizutani

FOREIGN PATENT DOCUMENTS

| CN | 1518282 A | 8/2004 |
|---|---|---|
| CN | 1874319 A | 12/2006 |
| CN | 101179453 A | 5/2008 |

OTHER PUBLICATIONS

Written Opinion of the International Searching Authority dated Mar. 19, 2009 in connection with International Patent Application No. PCT/CN2008/073342.
Office Action dated Nov. 27, 2009 in connection with Chinese Patent Application No. 200710195538.2.
International Search Report issued Mar. 19, 2009 in connection with International Patent Application No. PCT/CN2008/073342.

* cited by examiner

*Primary Examiner* — Un C Cho
*Assistant Examiner* — Siming Liu

(57) ABSTRACT

A link state detection method is disclosed in an embodiment of the present invention. The method includes: obtaining link state information from the lowest level SE to the mid-level SE; notifying to the mid-level SE the link state information from the lowest level SE to the mid-level SE; obtaining accessibility information from the mid-level SE to the lowest level SE according to the link state information from the lowest level SE to the mid-level SE, and link state information from the mid-level SE to the first level SE; notifying the first level SE the link state information from the mid-level SE to the first level SE, and the accessibility information from the from the mid-level SE to the lowest level SE; obtaining the accessibility information from the first level SE to the lowest level SE according to the link state information and the accessibility information sent by the mid-level SE.

15 Claims, 15 Drawing Sheets

<Prior Art>

<Prior Art>

| n-1 | ... | 4 | 3 | 2 | 1 | 0 |
|---|---|---|---|---|---|---|
| ACLn-1 | ... | ACL5 | ACL4 | ACL3 | ACL1 | ACL0 |

FIG. 5

|        | bit 0 ... N | N+1 |
|--------|-------------|-----|
| Link0  | TME ID      | vld |
| Link1  | TME ID      | vld |
| Link2  | TME ID      | vld |
| ⋮      |             |     |
| Linkn  | TME ID      | vld |

FIG. 8

|       | bit 0 ... N | N+1 |
|-------|-------------|-----|
| TME 0 | Link #      | vld |
| TME 1 | Link #      | vld |
| ⋮     | ⋮           | ⋮   |
| TME m | Link #      | vld |

FIG. 9

|  | Link 0 | | | Link N |
|---|---|---|---|---|
| TME 0 | 1 | 1 | | 1 |
| TME 1 | | | | |
| ⋮ | | | ⋯ | |
| TME m | 1 | 1 | | 1 |

LINK STATE DETECTION METHOD AND SYSTEM

CROSS-REFERENCE TO RELATED APPLICATIONS

This application is a continuation of International Application No. PCT/CN2008/073342, filed on Dec. 4, 2008, which claims priority to Chinese Patent Application No. 200710195538.2, filed on Dec. 6, 2007, both of which are hereby incorporated by reference in their entireties.

TECHNICAL FIELD

The present invention relates to the field of network communications technologies, and in particular, to a method and a system for link state detection.

BACKGROUND

With the rapid development of the Internet and the expanding of network scale, the network applications become increasingly complicated, and the network traffic increases rapidly. Therefore, a switching system featuring faster speed and larger capacity is required. A switching network, as the core of a large-capacity switching system, usually provides multiple available links from the source port to the destination port to meet the requirements for large-scale traffic switching at high speed. The system dynamically selects available links to transmit packets to the destination port. The system can be a processing unit, a network device, a switching device, a relevant network, or a combination of preceding devices. A packet represents a data unit of any type, including the fixed length cell and variable length packet. Some switching systems may be unavailable due to incorrect links. Therefore, the switching network needs to detect incorrect links and adjust the policy to distribute packets based on the updated link state.

FIG. 1 shows a structure of a typical multi-level multi-plane network in the prior art. The network includes a multi-level switching process. The Switching Element (SE) 1 and SE 3 may be located in one chip or two independent chips. The packet switching process is as follows: A Traffic Manager Ingress (TMI) distributes packets to each switching plane, the SE 1 distributes packets to each SE 2, SE 2 switches packets to SE 3, and then SE 3 switches packets to a Traffic Manager Egress (TME). TMI and TME represent the Traffic Manager (TM) on the uplink and downlink respectively. FIG. 1 shows that multiple available links exist between TMs or between SE 1 and SE 3 of each switching plane.

FIG. 2 is a flowchart of link auto-negotiation in a single-level switching system in the prior art. In the system, link auto-negotiation is implemented by switching the state of a receiving link between TM and SE. The workflow of link auto-negotiation technology is as follows:

The SE judges the state of the link from the TMI to SE based on the accuracy of packets received by the current link a. If the packets are received correctly, the SE determines that the current link a runs normally and sets the link_state a to 1; otherwise, the SE sets the link_state a to 0.

Similarly, the TME judges the state of the link from the SE to TME based on the accuracy of a packet received by the current link b. If the packet is received accurately, the SE determines that the current link b runs normally and sets the link_state b to 1; otherwise, the SE sets the link_state b to 0.

If the values of link_state a or link_state b are equal to 0, it indicates that at least one of two links between the TM and the SE is faulty. Therefore, the TMI closes up the link a and the SE closes up the link b. If the values of link_state a and link_state b are equal to 1, the TMI uncloses the link a and the SE uncloses the link b. If a link is closed up, the TMI does not request the closed up link to transmit packets, and the SE does not arbitrate the closed up link.

In the process of implementing the present invention, the inventor finds the following problems in the prior art: The preceding link auto-negotiation method is only applicable to a single-level switching system. The link negotiation function cannot be implemented in a multi-level multi-plane switching architecture. The TMI or SE 1 may not acquire the state of a link from SE 3 to TME, and this results in blocking of packets due to an invalid link and failed switching of packets. For example, in FIG. 1, assuming that the link from SE 2_0 to SE 3_i is invalid, SE 1_0 fails to switch packets to SE 3_i because the packets are blocked in SE 2_0. However, if SE 1_0 knows that packets fail to be switched to SE 3_i through SE 2_0, SE 1_0 distributes the packets to another SE 2, and this sidesteps the problem caused by an invalid link between SE 2_0 and SE 3_i.

Therefore, in a multi-level multi-plane switching system, a first level chip must know not only its link connection state and the link connection state of a second level chip, but also the link connection state of the second level chip and a third level chip. Similarly, available links between TMs exist on different switching planes. Therefore, a TMI needs to know whether a link on a plane can arrive at a TME, so that the TMI can adjust the packet distribution policy in time. In one word, a simple and efficient link state detection notification mechanism with high real-time performance is required urgently, so that the SE 1 or TMI can know the link state from a lower level SE to TME to meet the requirements in a multi-level switching system.

SUMMARY

A method and a system for link state detection are provided herein to solve the problem in the prior art that results in blockage of a mid-level SE due to a blocked lower level link.

A link state detection method is provided in an embodiment of the present invention to achieve the preceding purposes. The method includes:

obtaining, by the lowest level SE, link state information from the lowest level SE to the mid-level SE;

notifying to the mid-level SE, by the lowest level SE, the link state information from the lowest level SE to the mid-level SE;

obtaining, by the mid-level SE, accessibility information from the mid-level SE to the lowest level SE according to the link state information from the lowest level SE to the mid-level SE, and link state information from the mid-level SE to the first level SE;

notifying the first level SE, by the mid-level SE, the link state information from the mid-level SE to the first level SE, and the accessibility information from the from the mid-level SE to the lowest level SE;

obtaining, by the first level SE, the accessibility information from the first level SE to the lowest level SE according to the link state information and the accessibility information sent by the mid-level SE.

A link state detection system is provided in an embodiment of the present invention. The system includes:

a TME, configured to detect the state of a link to the TME;

an SE, configured to receive the link state information, which is detected by the TME, from the SE to the TME, acquire the accessibility information from the SE to the TME, and detect the state of a link to the SE; and a TMI, configured to receive the accessibility information, which is sent by the SE, from the SE to the TME and the state of a link from the TMI to the SE, and acquire the accessibility information from the TMI to the TME based on the accessibility information, which is sent by the SE, from the SE to the TME and the state of a link from the TMI to the SE.

An SE is provided in an embodiment of the present invention. The SE includes:

a lowest level SE, configured to acquire the accessibility information from the lowest level SE to the TME according to link state information sent by the TME, acquire link state information from the lowest level SE to a mid-level SE, and transmit the accessibility information from the lowest level SE to the TME and the link state information from the lowest level SE to the mid-level SE to the mid-level SE;

the mid-level SE, configured to obtain accessibility information from the mid-level SE to the TME according to the accessibility information and link state information sent by the lowest level SE, acquire link state information from the mid-level SE to a first level SE, and transmit the accessibility information from the mid-level SE to the TME and the link state information from the mid-level SE to the first level SE to the first level SE;

a first level SE, configured to obtain accessibility information from the first level SE to the TME according to the accessibility information and link state information sent by the mid-level SE, acquire link state information from the first level. SE to the TMI, and transmit the accessibility information from the first level SE to the TME and the link state information from the first level SE to the TMI to the TMI.

A TME is provided in an embodiment of the present invention. The TME includes:

a receiving module, configured to receive the data that is sent by a lowest level SE;

a detecting module, configured to detect the link state information from the lowest level SE to the receiving module; and a notifying module, configured to notify the link state information, which is detected by the detecting module to the lowest level SE.

Compared with the prior art, the technical solution provided in an embodiment of the present invention has the following advantages:

The packet distribution tables of the TMI and SEs at all levels are maintained, so that the TMI and SEs can automatically sidestep the problem of packets blocking in a mid-level or on a plane due to an invalid link when distributing packets, thus implementing the automatic detection function of multi-level multi-plane switching network link state.

BRIEF DESCRIPTION OF THE DRAWINGS

Figure 5:
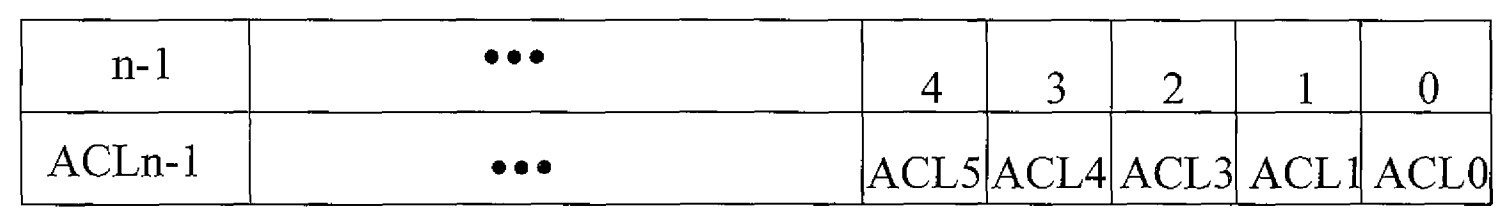

FIG. 5 shows a link state register in an embodiment of the present invention;

FIG. 8 shows an SE 3 route table provided in an embodiment of the present invention;

FIG. 9 shows an SE 2 route table provided in an embodiment of the present invention;

DETAILED DESCRIPTION

The following section explicitly describes the complete technical solution provided in the embodiments of the present invention. Obviously, only parts of the embodiments of the present invention are involved herein. All the other embodiments obtained by those skilled in the art without creative work based on the embodiments of the present invention fall in the scope of protection of the present invention.

The specific implementation of the present invention is described by referring to figures and embodiments.

The TMI data distribution tables and/or the data distribution tables of the first level SE are maintained through a link detection packet provided in an embodiment of the present invention, so that the TMI and the first level SE can automatically sidestep the problem of packets blocking in a mid-level due to an invalid link when distributing packets. The link state information that is notified by levels by the first level SE according to the lowest level SE enables the first level SE to know all the link state information that is transmitted to the lowest level SE. In this case, when a link is faulty, the first level SE can know and select another mid-level SE in time to forward packets according to a distribution table, and this avoids a technical defect of blocking a mid-level SE due to a faulty lower level link in the multi-level switching system. Similarly, the link accessibility information that is notified by the TME by levels in an embodiment of the present invention enables the TMI to know the accessibility information of the TME, and thus a technical defect of blocking a plane caused by the link fault from the plane to the TME in a multi-plane switching system is solved. In addition, the preceding two technologies provided in an embodiment of the present invention can be combined to solve the preceding technical defect in a multi-level multi-plane switching system.

Figure 1:
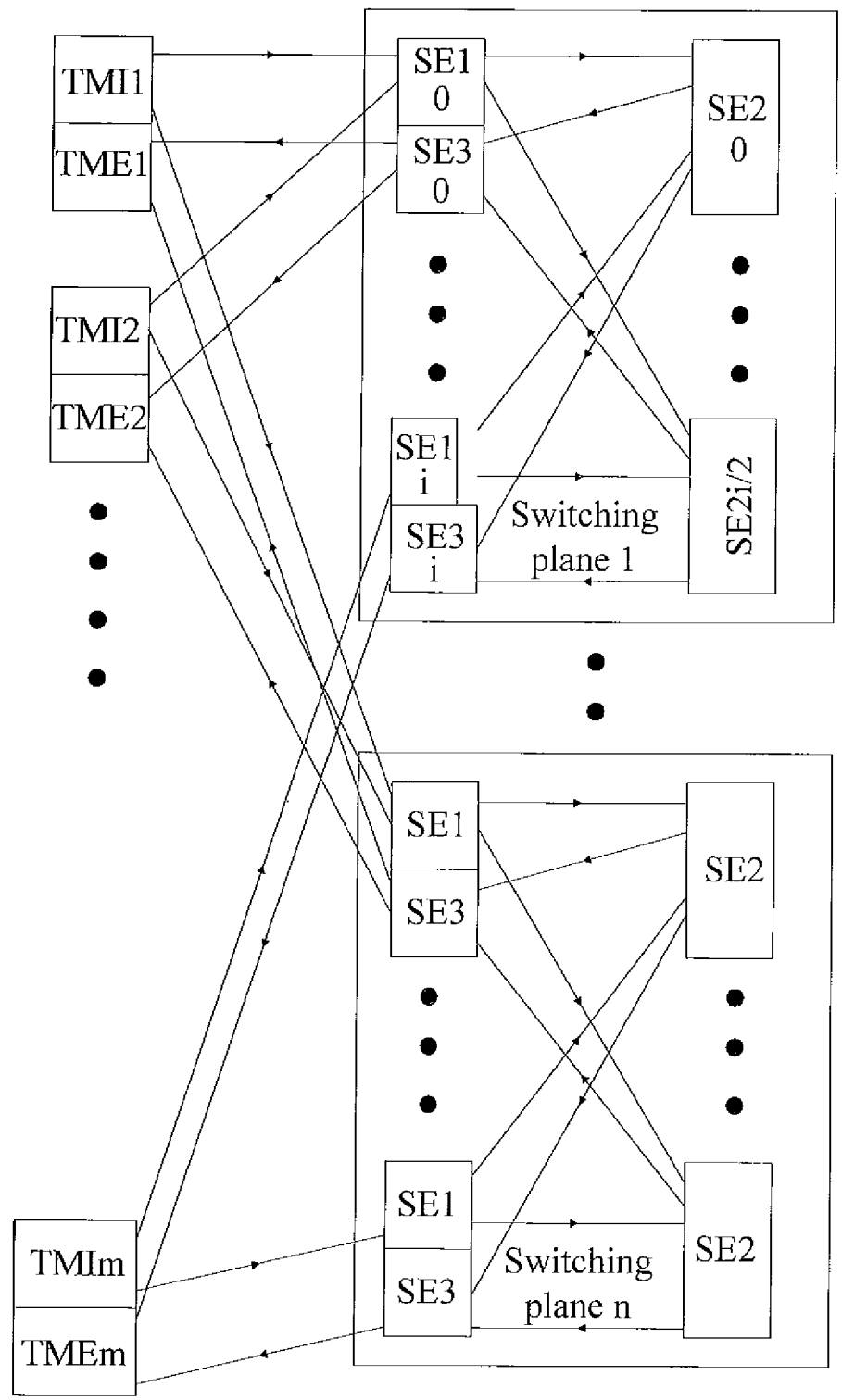
FIG. 1 shows a multi-level multi-plane system switching structure in the existing technical solution.
Figure 2:
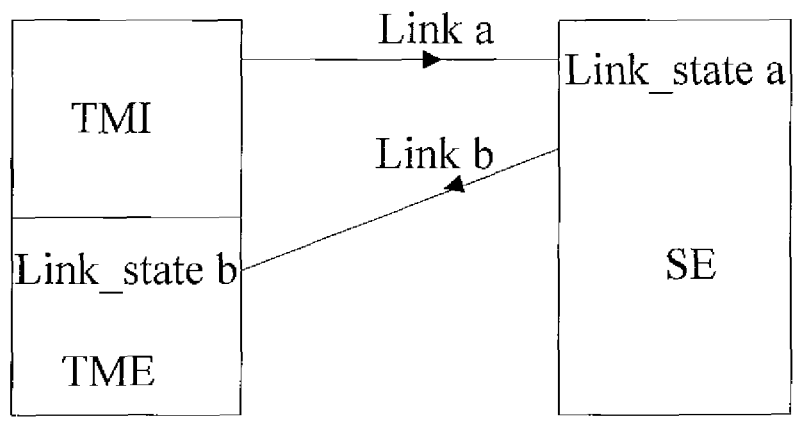
FIG. 2 shows a link auto-negotiation technology in the existing technical solution.
Figure 3A:
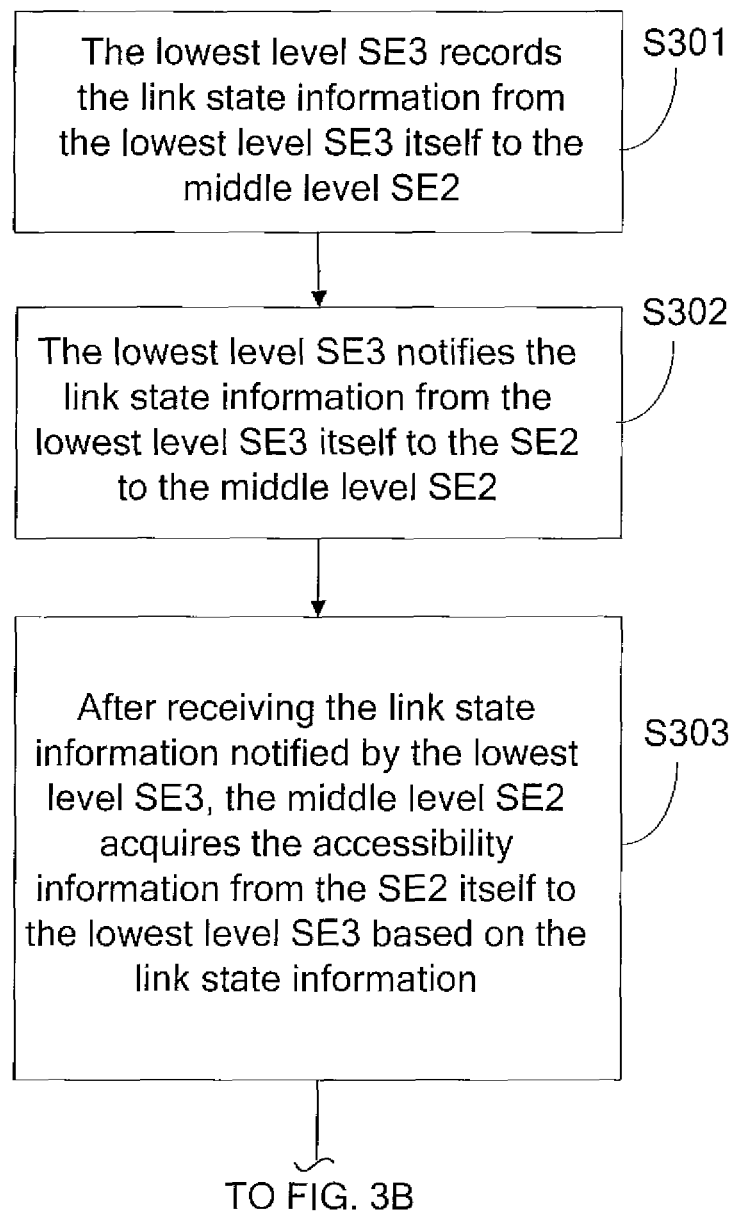
FIG. 3 is a flowchart of a link state detection method in a multi-level switching network provided in embodiment 1 of the present invention.
Figure 3B:
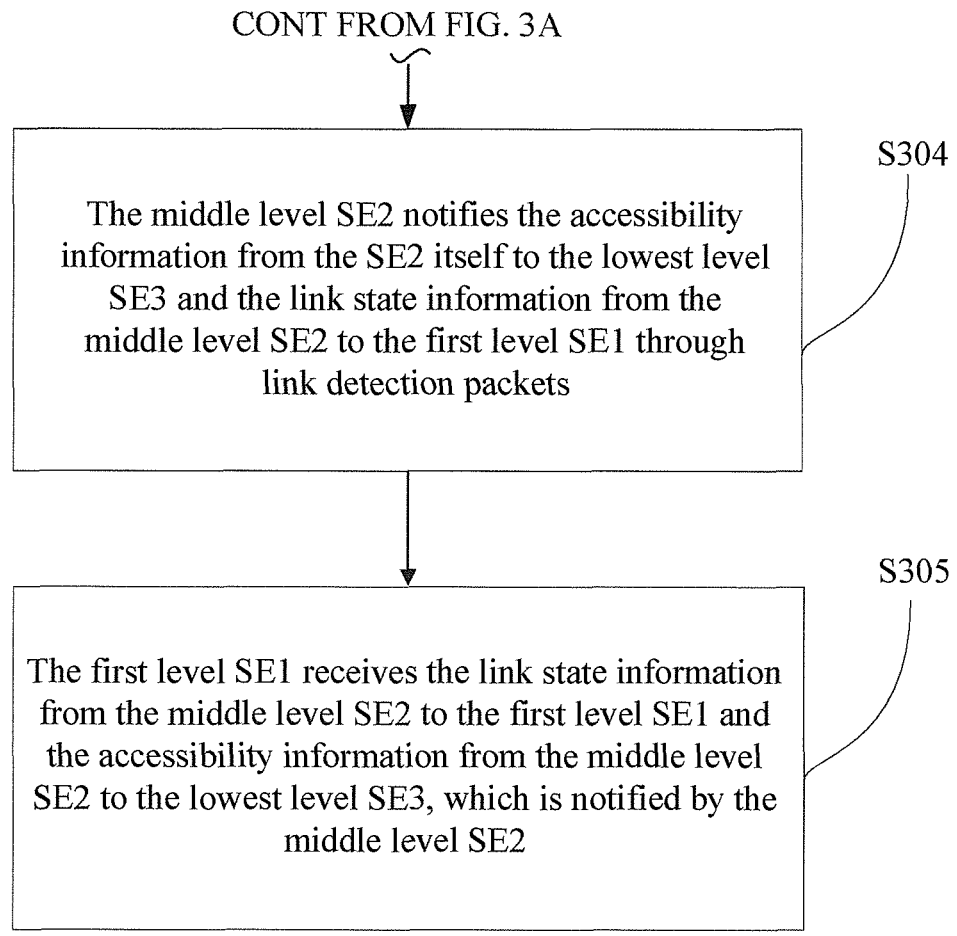
Figure 4:
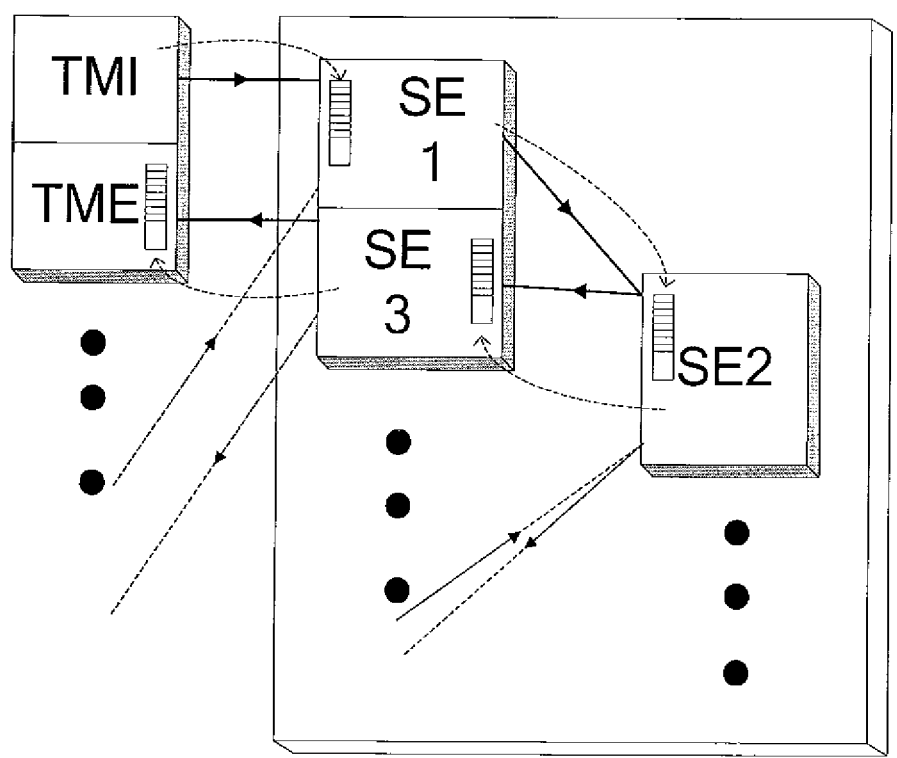
FIG. 4 shows a process of generating link state tables at all levels provided in an embodiment of the present invention.

FIG. 3 is a flowchart of a link state detection method in the multi-level switching network provided in embodiment 1 of the present invention. The link state information that is notified by the lowest level SE by levels enables the first level SE to know all the link state information that is transmitted to the lowest level SE. In this case, when a link is faulty, the first level SE can know and select another SE in time to forward packets according to a distribution table. To facilitate the understanding of the present invention, multi-level system switching structure shown in FIG. 4 is taken as an example to describe the following embodiments. A three level switching network containing SE 1, SE 2, and SE 3 is taken as an example, where SE 1 is deemed as the first level SE, SE 2 as the mid-level SE, and SE 3 as the lowest level SE. The preceding 3 level switching network is described to facilitate the understanding of the embodiment. However, the number of levels in a switching network is not restricted in an embodiment of the present invention. The change of number of levels in the switching network is protected in an embodiment of the present invention. The embodiment includes the following steps:

Step 301: The lowest level SE 3 records the link state information from the lowest level SE 3 itself to the mid-level SE 2. In an embodiment of the present invention, the link state information from the lower level SE to the upper level SE can be recorded in a mode of setting a link state register in the SE. The lower level SE judges whether a receiving link between the lower level. SE and the upper level SE is normal according to the accuracy of packets sent by the upper level SE. FIG. 5 shows a link state register provided in an embodiment of the present invention. Each bit indicates the state of a receiving link on the switching network side: The flag bit is set to 1 when the state is normal, and the flag bit is set to 0 when the state is abnormal.

It should be noted that, among all the flag bits in an embodiment of the present invention, the binary number 1 represents validity and the binary number 0 represents invalidity. It is understandable that the document does not restrict the meanings represented by 1 and 0. For example, in a link state register, 1 represents a normal link, and 0 represents a faulty link; among vld bits described in the following section, 1 represents the accessibility state from the TMI or SE to the corresponding TME, and 0 represents the inaccessibility state from the TMI or SE to the corresponding TME.

The lowest level SE 3 determines the state of a link as follows. If SE 3 receives packets from the mid-level SE 2 correctly, it indicates that the link to receive packets is in the normal state, and the corresponding bit in the link state register is set to 1. If SE 3 fails to receive packets correctly, it indicates that the link to receive packets is faulty, and the corresponding bit in the link state register is set to 0. Similarly, in the embodiment, the mid-level SE 2 also needs to judge the link state information from the mid-level SE 2 itself to the first level SE 1. It should be noted that a certain sequence does not exist during the link state detection between an SE at a level and the upper level SE provided in an embodiment of the present invention. That is, the detection may not be started from the lowest level SE. The link state detection between SEs provided in an embodiment of the present invention can be performed in automatic, periodical or non-periodical mode.

Step 302: The lowest level SE 3 notifies the mid-level SE 2 of the link state information from the lowest level SE 3 itself to the mid-level SE 2. In a preferred mode provided in an embodiment of the present invention, the lowest level SE 3 also needs to notify the mid-level SE 2 of SE-ID indicating the ID information of the lowest level SE 3. At present, two addressing modes exist: One is TME-ID addressing mode, and the other is TME-ID+lowest level SE-ID addressing mode. Assume that 32 planes and 2048 TMEs exist in a whole network. 32 SE 2s, 64 SE 1s, and 64 SE 3s exist on each plane. Each SE 3 is connected to 32 TMEs. In this case, the TMI can distinguish the TME by 11 bits, that is, the TMI sends a packet with 11 bit destination address to the TME. In one mode, the TME-ID exclusively uses the 11-bit destination address, and the TMI, SE 1, SE 2, and SE 3 perform addressing based on the 11 bit address. In the other mode, the TME-ID and the lowest level SE-ID share the 11 bit destination address, for example, SE 3-ID uses 6 bits, and the TME-ID uses 5 bits. Therefore, SE 1 and SE 2 perform addressing based on the first 6 bits (SE3-ID) of the destination address, and SE 3 performs addressing based on the last 5 bits of the destination address. It should be noted that the addressing mode is not restricted in an embodiment of the present invention. If the second mode is used for addressing, the lowest level SE 3 needs only to notify its SE-ID when notifying the link state information.

A notifying mode is disclosed in an embodiment of the present invention, that is, the lowest level SE 3 notifies the mid-level SE 2 of a link detection packet. The link detection packet carries the link state information from the lowest level SE 3 to the mid-level SE 2 or carries the SE-ID of the lowest level SE 3. Specifically, the link state from the lowest level SE 3 to the mid-level SE 2 is carried by the Access Control List (ACL) information in the link detection packet. The link detection packet can be notified periodically or notified to the upper level SE when a link state register changes due to a faulty link. If SE 3 and SE 1 are in a same chip, the lowest level SE 3 can send the link state information to the first level SE 1 through an internal bus between the lowest level SE 3 and the first level SE 1, and the first level SE 1 can send the information to the mid-level SE 2 through a downlink. If SE 3 and SE 1 are not in a same chip, the link state information may be sent to the first level SE 1 through an external bus between SE 3 and SE 1, and then SE 1 sends the information to the mid-level SE 2 through a downlink.

Step 303: After receiving the link state information notified by the lowest level SE 3, the mid-level SE 2 acquires the accessibility information from the SE 2 itself to the lowest level SE 3 based on the link state information.

Step 304: The mid-level SE 2 notifies the accessibility information from the SE 2 itself to the lowest level SE 3 and the link state information from the mid-level SE 2 to the first level SE 1 through link detection packets. The link state information from the mid-level SE 2 to the first level SE 1 is acquired in the same way as acquiring the link state information from the lowest level SE 3 to the mid-level SE 2 described in step 301. No more details are given here. Of course, if multiple mid-level SEs exist, the information is notified by levels in preceding mode. The preceding description shows that when delivering link detection packets in an embodiment of the present invention, an SE at a level adds the link state information from the SE itself to an upper level SE and then notifies the upper level SE of the information.

Step 305: The first level SE 1 receives the link state information, which is notified by the mid-level SE 2, from the mid-level SE 2 to the first level SE 1, and the accessibility information from the mid-level SE 2 to the lowest level SE 3. The first level SE 1 acquires the link state from the first level SE 1 to the lowest level SE 3 according to a distribution table that is generated on the basis of the accessibility information from link state information to the lowest level SE 3.

Figure 6A:
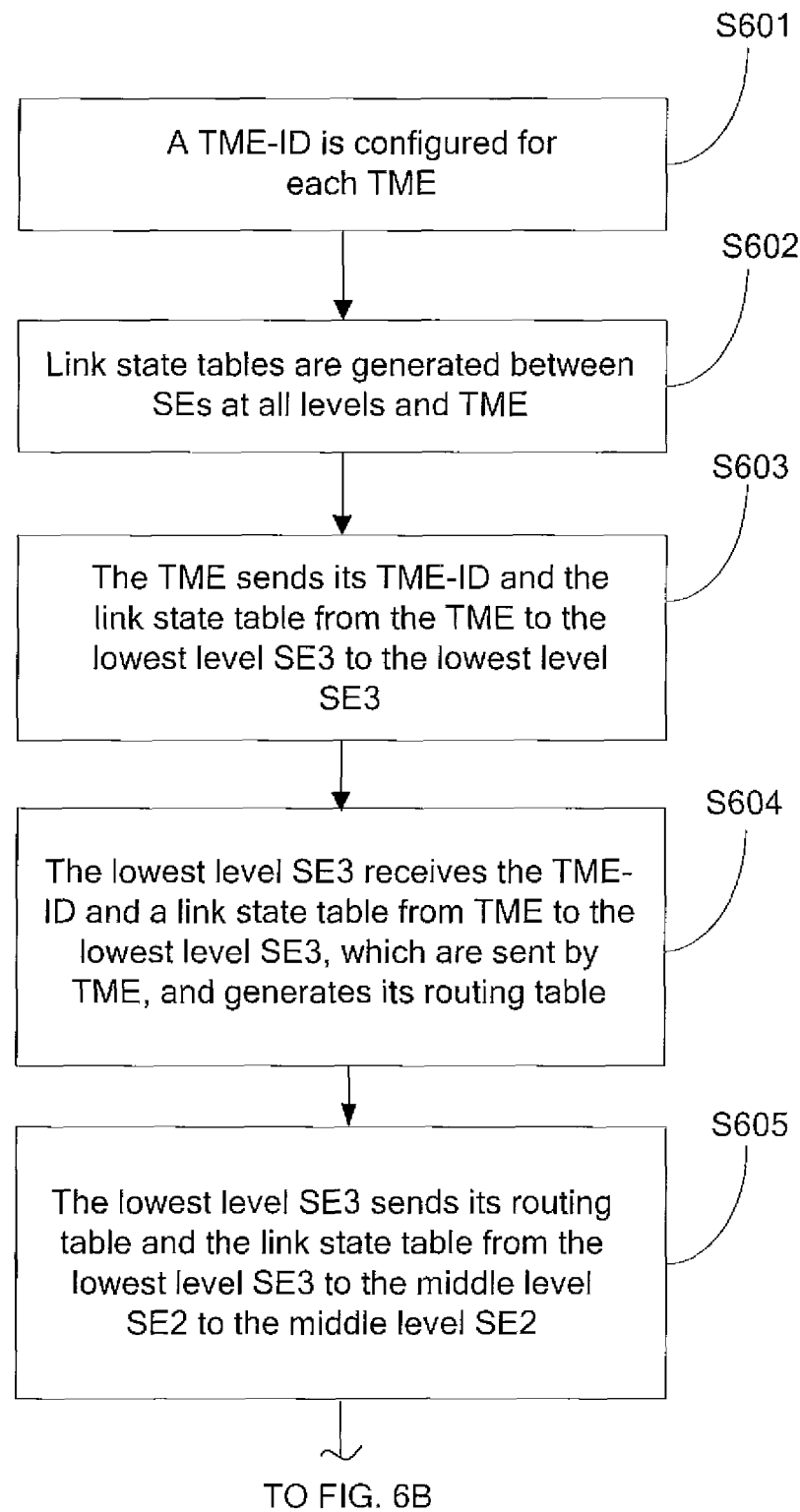
FIG. 6 is a flowchart of a link state detection method in a multi-level multi-plane switching network provided in embodiment 2 of the present invention.
Figure 6B:
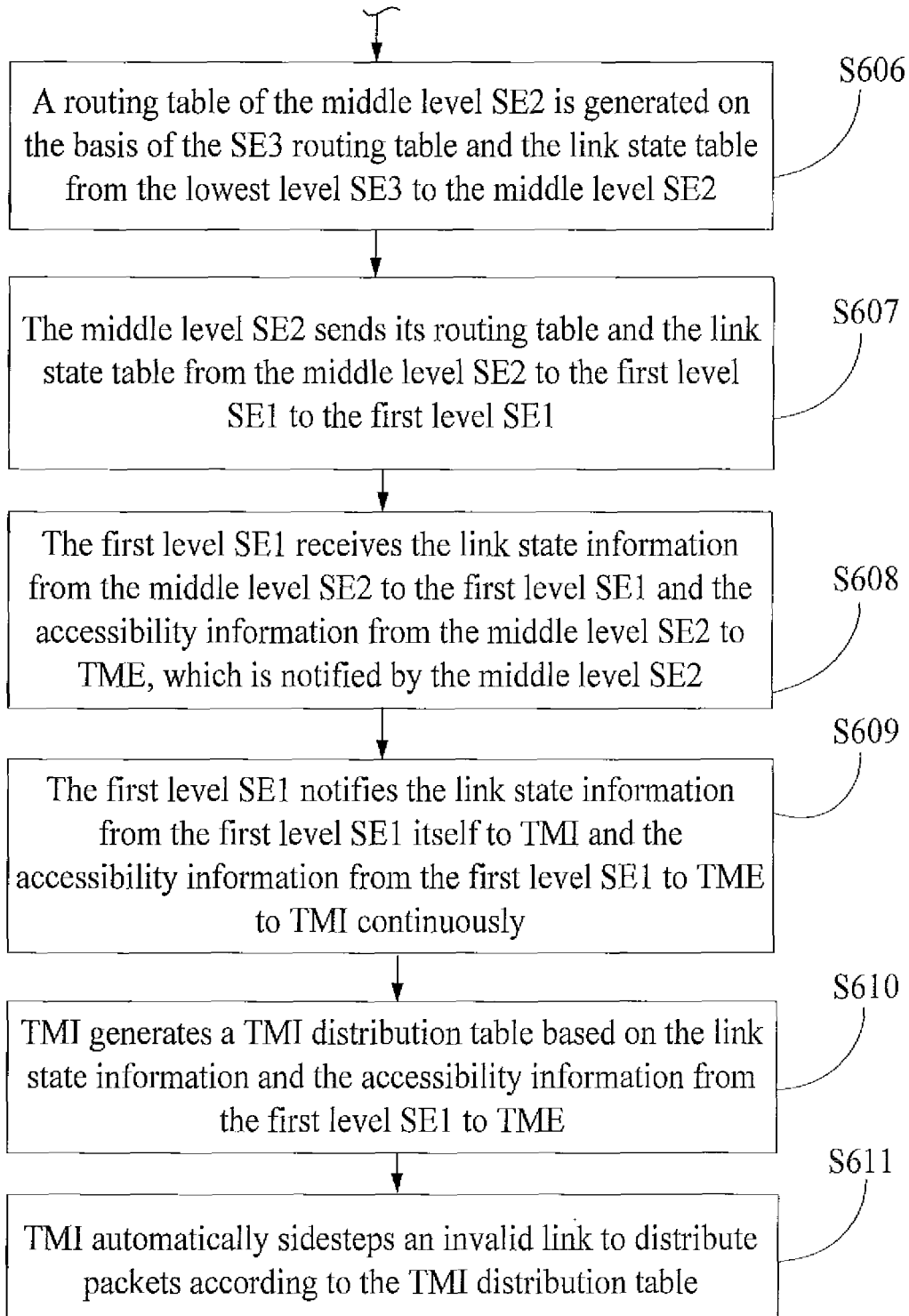

FIG. 6 is a flowchart of a link state detection method in the multi-level multi-plane switching network provided in embodiment 2 of the present invention. In the embodiment as a preferred solution in the present invention, a problem of blocking mid-level SEs arisen in a multi-level switching network can be solved and a problem of blocking a plane arisen in a multi-plane switching network can also be solved. The technical solution for separately solving the problem of blocking a plane on a multi-plane switching network is similar to the embodiment. Therefore, a link state detection method in a multi-plane switching network is not described any more. The embodiment includes:

Step 601: A TME-ID is configured for each TME. In an embodiment of the present invention, a TME-ID can be configured for a TME through the software. The TME-ID serves as the unique ID of the TME and as the destination address that is required for addressing by the TMI and SEs at all levels.

Figure 7:
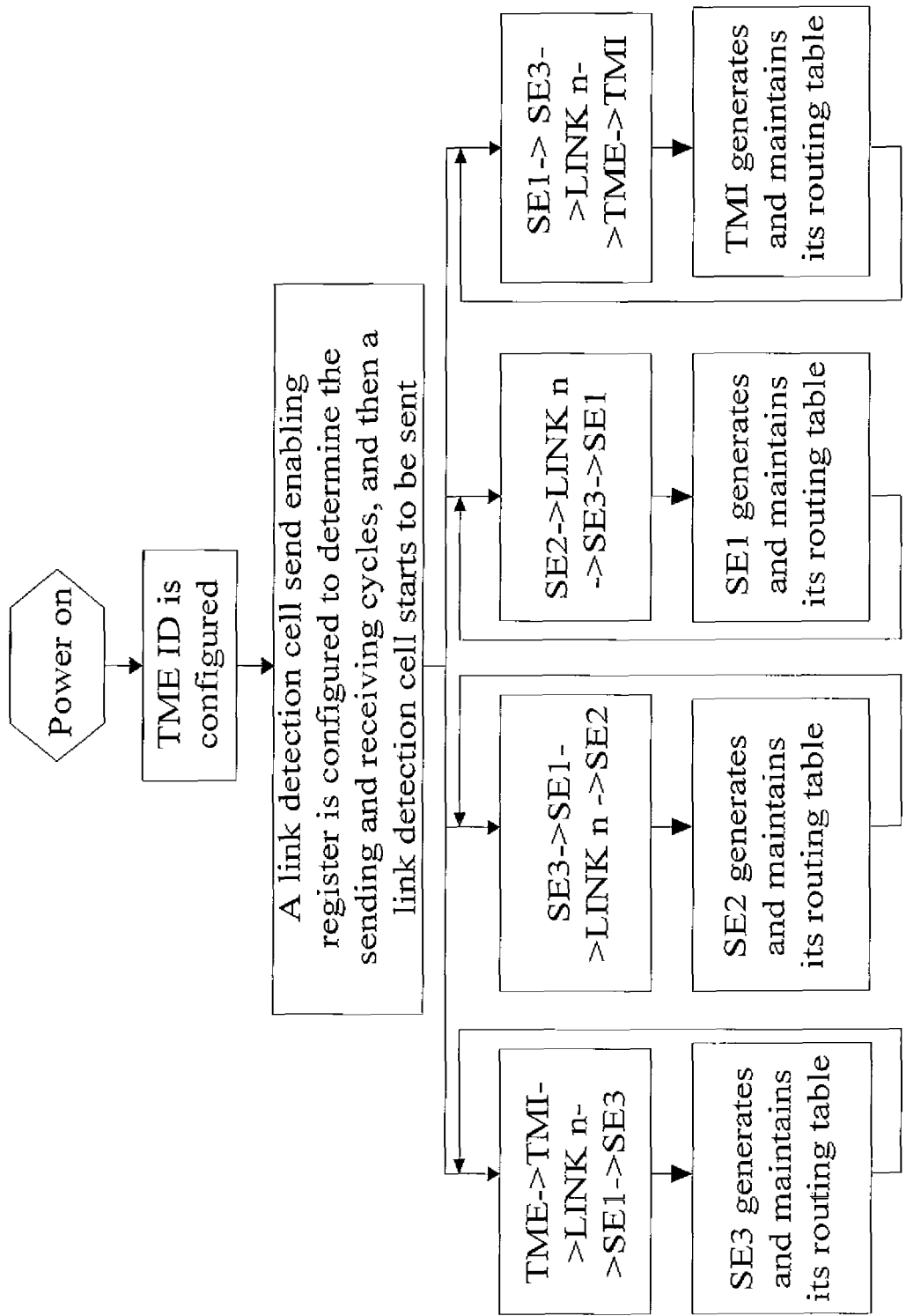
FIG. 7 shows an automatic detection process of link state provided in an embodiment of the present invention.

Step 602: Link state tables are generated by SEs at all levels and the TME. The link state tables can be generated by SEs at all levels and the TME at the same time. The tables include: a link state table from the TME to the lowest level SE 3, a link state table from the lowest level SE 3 to the mid-level SE 2, a link state table from the mid-level SE 2 to the first level SE 1, and a link state table from the first level SE 1 to the TMI. FIG. 7 shows an automatic detection process of link state provided in an embodiment of the present invention. The figure shows that the link state tables of SEs at all levels are generated separately. No certain time-based or procedure-based sequence exists between the preceding link state tables and the link state tables of other SEs or TME. For example, SE 2 generates a routing table based on the link state table between SE 2 and SE 3 and changes the routing table when the link state table is modified. The link state information from SE 3 to SE 2 is sent to SE 1 through an internal bus when SE 3 and SE 1 are in a same chip or an external bus when SE 3 and SE 1 are not in a same chip. SE 1 sends the information to SE 2 through a downlink. SE 2 maintains its routing table based on the received link state information from SE 2 to SE 3. SE 2 can update its routing table in time after the link state from SE 3 to SE 2 changes. Similarly, SE 1 maintains its distribution table according to the link state information, which is notified by SE 2, from SE 1 to SE 2. SEs at all levels provided in the preceding embodiment of the present invention maintain their routing tables separately. Of course, a lowest level SE or the TME can initiate a request and then maintain its routing table or distribution table by levels. For example, if the TME initiates a request, the TME sends the link state information to the lowest level SE 3, and the lowest level SE 3 updates its routing table. Subsequently, SE 2 initiates a request, and so on. Finally, the routing tables or distribution tables of SEs at all levels and the TMI in a whole link are maintained. Therefore, the change of link state detection process is protected by the embodiments of the present invention. Similarly, in the embodiment, the link state information from the lower level SE to the upper level SE can be recorded in a mode of setting a link state register in the SE. The lower level SE judges whether a receiving link between the lower level SE and the upper level SE is normal according to the accuracy of packets sent by the upper level SE. Each bit indicates the state of a receiving link on the network side: The flag bit is set to 1 when the state is normal and the flag bit is set to 0 when the state is abnormal. The lowest level SE 3 determines the state of a link as follows: If SE 3 receives packets from the mid-level SE 2 correctly, it indicates that the link to receive packets is in the normal state, and the corresponding bit in the link state register is set to 1; if SE 3 fails to receive packets correctly, it indicates that the link to receive packets is faulty, and the corresponding bit in the link state register is set to 0. For example, if SE 1 determines the receiving link from TMI to SE 1 is in the normal state, the corresponding flag bit in the link state register is set to 1; otherwise, the corresponding flag bit is set to 0.

If SE 2 determines the receiving link from SE 1 to SE 2 is in the normal state, the corresponding flag bit in the link state register is set to 1; otherwise, the corresponding flag bit is set to 0.

If SE 3 determines the receiving link from SE 2 to SE 3 is in the normal state, the corresponding flag bit in the link state register is set to 1; otherwise, the corresponding flag bit is set to 0.

If the TME determines the receiving link from SE 3 to TME is in the normal state, the corresponding flag bit in the link state register is set to 1; otherwise, the corresponding flag bit is set to 0. Finally, state tables of links at all levels are generated.

Step 603: The TME sends its TME-ID and the link state table from the TME to the lowest level SE 3 to the lowest level SE 3. In an embodiment of the present invention, a link detection packet can be sent to the lowest level SE 3. The link detection packet carries TME-ID of the TME and the link state table from the TME to the lowest level SE 3. In the embodiment, suppose that SE 1 and SE 3 are in a same chip, and TMI and TME are also in a same chip. The TME transmits a link detection packet including the TME-ID and the link state information from the lowest level SE 3 to the TME to the TMI through an internal bus of the chip. TMI transmits the link detection packet to SE 1 through a downlink. Subsequently, SE 1 sends the link detection packet or the link state information from SE 3 to TME in the link detection packet to SE 3.

In the following description, suppose that SE 1 and SE 3 are in a same chip and TMI and TME are also in a same chip. The link state information from SE 3 to TME is described as link state_TME, and the link state_TME received by SE 3 is described as the link state information that is received by SE 1 and carried by a link detection packet.

Step 604: The lowest level SE 3 receives the TME-ID and a link state table from TME to the lowest level SE 3, which are sent by TME, and generates its routing table. FIG. 8 shows an SE 3 routing table provided in an embodiment of the present invention. The routing table records the accessibility information from the lowest level SE 3 to TME.

The embodiment regulates that SE 3 can transmit relevant information to TME if the link from SE 3 to TME and the link from TMI to SE 1 are normal. Of course, the regulations of link accessibility are different in all kinds of network architectures. The regulation is not restricted in an embodiment of the present invention.

The lowest level SE 3 writes the TME ID in a link detection packet that is received by link n into the TME ID location at the n ingress of a unicast routing table. The lowest level SE 3 writes the result of link state_TME (link state information from SE 3 to TME) & link state_SE1 (link state information from TMI to SE 1) into the vld location at the n ingress. The link state_TME indicates the link state carried by a link detection packet that is received by SE 1 from the link n; the link state_SE1 indicates the link state corresponding to the link n in the link state register of SE 1. SE1 sends the link state_SE1 to SE 3 through an internal bus between SE 1 and SE 3.

Step 605: The lowest level SE 3 sends its routing table and the link state table from the lowest level SE 3 to the mid-level SE 2 to the mid-level SE 2. In an embodiment of the present invention, a link detection packet can be sent to the mid-level SE 2. The link detection packet carries the routing table of the lowest level SE 3 and the link state table from the lowest level SE 3 to the mid-level SE 2. If SE 3 and SE 1 are in a same chip, the lowest level SE 3 can send the link state information to the first level SE 1 through an internal bus between the lowest level SE 3 and the first level SE 1, and the first level SE 1 can send the information to the mid-level SE 2 through a downlink. If SE 3 and SE 1 are not in a same chip, the link state information can be sent to the first level SE 1 through an external bus between SE 3 and SE 1, and then SE 1 sends the information to the mid-level SE 2 through a downlink.

Step 606: The mid-level SE 2 receives the SE 3 routing table, which records the accessibility information from the lowest level SE 3 to TME, from the lowest level SE 3 and the link state table from the mid-level SE 2 to the lowest level SE 3. The mid-level SE 2 also generates its routing table based on the SE 3 routing table and the link state table from the mid-level SE 2 to the lowest level SE 3. FIG. 9 shows an SE 2 routing table provided in an embodiment of the present, invention. The routing table records the accessibility information from the mid-level SE 2 to TME.

The embodiment regulates that SE 2 can transmit relevant information to SE 3 if the link from SE 2 to SE 3 and the link from SE 1 to SE 2 are normal. Of course, the regulations of link accessibility are different in all kinds of network architectures. The regulation is not restricted in an embodiment of the present invention.

The mid-level SE 2 extracts the TME-ID in a link detection packet that is received by link n as the address of a routing table and writes link n into the link N location at the TME-ID ingress shown in FIG. 9. The mid-level SE 2 writes the result of link state_SE3, which indicates the link state information from SE 2 to SE 3, & link state_SE2, which indicates the link state information from SE 1 to SE 2, & vldSE3 into the vld location at the ingress corresponding to the TME ID. The link state_SE3 indicates the link state carried by a link detection packet that is received by SE 2 from the link n. The link state_SE2 indicates the link state corresponding to link n in a link state register of SE 2. vldSE3 represents the vld bit in the SE 3 routing table carried by a link detection packet that is received by SE 2 from link n and indicates whether a normal accessibility link from the mid-level SE 2 to the TME corresponding to the TME ID exists.

Step 607: The mid-level SE 2 sends its routing table and the link state table from the mid-level SE 2 to the first level SE 1 to the first level SE 1. In an embodiment of the present invention, a link detection packet can be sent to the first level SE 1. The link detection packet carries the routing table of the mid-level SE 2 and the link state table from the mid-level SE 2 to the first level SE 1. The mid-level SE 2 first sends its routing table and the link state table from the mid-level SE 2 to the first level SE 1 to the lowest level SE 3 through a downlink. If the lowest level SE 3 and the first level SE 1 are in a same chip, the lowest level SE 3 sends the routing table of the mid-level SE 2 and the link state table from the mid-level SE 2 to the first level SE 1 to the first level SE 1 through an internal bus between the lowest level SE 3 and the first level SE 1. If the lowest level SE 3 and the first level SE 1 are not in a same chip, the routing table of the mid-level SE 2 and the link state table between the mid-level SE 2 and the first level SE 1 can be sent to the first level SE 1 through an external bus between SE 3 and SE 1. Step 608: The first level SE 1 receives the link state information from the mid-level SE 2 to the first level SE 1 and the accessibility information from the mid-level SE 2 to TME, which is notified by the mid-level SE 2. The first level SE 1 generates a relevant distribution table of the first level SE based on the link state information and the accessibility information from the first level SE 1 to the TME. The first level SE 1 knows the link state from the first level SE 1 to TME based on the distribution table of the first level SE.

The embodiment regulates that SE 1 can transmit relevant information to SE 2 if the link from SE 2 to SE 3 and the link from SE 1 to SE 2 are normal. Of course, the regulations of link accessibility are different in all kinds of network architectures. The regulation is not restricted in an embodiment of the present invention.

Figures 10, 11:
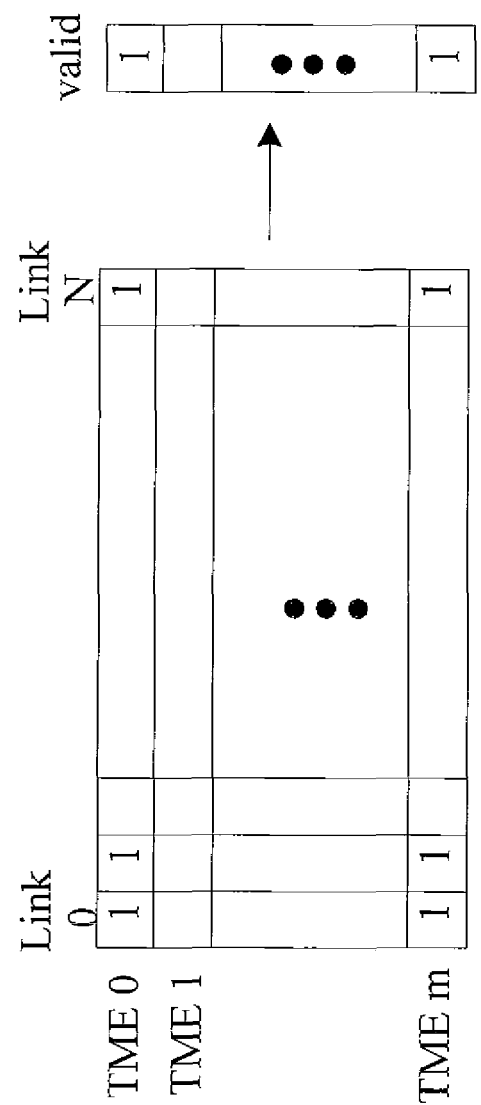
FIG. 10 shows an SE 1 distribution table provided in an embodiment of the present invention.
FIG. 11 shows a compression process of a distribution table provided in an embodiment of the present invention.

FIG. 10 shows a distribution table of SE 1 provided in an embodiment of the present invention. The distribution table records the accessibility information from various links of SE 1 to TME. For example, if the values corresponding to Link0 and TME0 are 1, it indicates that SE 1 can transmit packets to TME0 through Link0. Specially, when link state_SE3 & link state_SE2=1, which indicates the accessibility from SE 1 to SE 2, SE 1 writes the vld bit, which indicates the accessibility information from SE 2 to TME, in the (m+1) bit SE 2 routing table in a link detection packet received by link n into the column n of the SE 1 distribution table. When link state_SE3 & link state_SE2=0, which indicates the inaccessibility from SE 1 to SE 2, SE 1 writes (m+1) bit 0 into the column n. The link state_SE2 indicates the link state from SE 1 to SE 2 carried by a link detection packet that is received by SE 3 from link n. The link state_SE2=1 indicates that SE 2 can receive packets from SE 1 correctly and link state_SE2=0 indicates the reverse condition. The link state_SE3 indicates the link state of link n in a link state register of SE 3. The link state_SE3=1 indicates that SE 3 can receive packets from SE 2 correctly and the link state_SE3=0 indicates the reverse condition.

Step 609: The first level SE 1 continues to notify the TMI of the link state information from the first level SE 1 itself to the TMI and the accessibility information from the first level SE 1 to the TME. In an embodiment of the present invention, a link detection packet can be sent to the TMI. If the lowest level SE 3 and the first level SE 1 are in a same chip, the first level SE 1 sends the link state information from the first level SE 1 itself to TMI and the accessibility information from the first level SE 1 to TME to the lowest level SE 3 through an internal bus between the first level SE 1 and the lowest level SE 3. Subsequently, the preceding information is sent to TME through a downlink between the lowest level SE 3 and TME. Then, the TME sends the preceding information to TMI through an internal bus or external bus on a chip. Similarly, if the lowest level SE 3 and the first level SE 1 are not in a same chip, the first level SE 1 sends the link state information from the first level SE 1 itself to the TMI and the accessibility information from the first level SE 1 to the TME to the lowest level SE 3. Subsequently, the preceding information is sent to the TMI through the lowest level SE 3 and the TME.

In an embodiment of the present invention, before the first level SE 1 notifies the TMI of packets, the first level SE 1 compresses its distribution table to generate the accessibility information from the first level SE 1 to the TME. In this way, the amount of data transmitted between the first level SE 1 and the TMI is reduced. FIG. 11 shows a compression process of a distribution table provided in an embodiment of the present invention. The entire SE 1 distribution table is compressed into an (m+1) bit table. Specially, for the values corresponding to the (n+1) links containing link 0 to link n of the first level SE 1 and the value of the TME in a routing table shown in FIG. 10, if a value is 1, it indicates that at least one link of the first level SE 1 is reachable to the TME. Therefore, the first level SE 1 sets the compression bit of the TME-ID to 1. For example, if the compression bit of TME0 is 1, it indicates that at least one link of the first level SE 1 is reachable to TME0. The TMI is sure that packets can be sent to TME0 through the first level SE 1. The first level SE 1 determines how to send packets to TME0 through a normal link according to a distribution table of the first level SE 1. Only 1 is taken as an example here. Another value can be used in the actual application. Of course, a threshold value can be set. When the number of links that are reachable to the TME is equal to or higher than the threshold value, that is, the number n of links that are reachable to the TME is not lower than the threshold value m, the TME can be accessed.

Figures 12, 13:
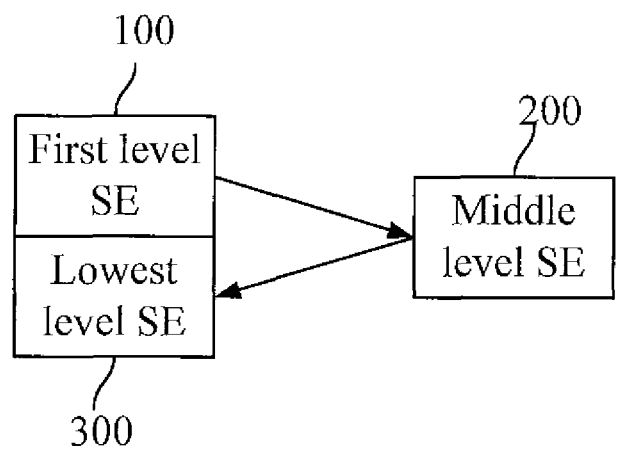
FIG. 12 shows a TMI distribution table provided in an embodiment of the present invention.
FIG. 13 shows a structure of a link state detection system provided in embodiment 3 of the present invention.

Step 610: The TMI generates a TMI distribution table based on the link state information and the accessibility information from the first level SE 1 to the TME. FIG. 12 shows a TMI distribution table provided in an embodiment of the present invention. The TMI can acquire the link state from the TMI to the TME based on the TMI distribution table. When link state_TME & link state_SE1=1, which indicates the accessibility from the TMI to the SE 1, TMI writes the vld bit in the (m+1) bit SE 1 distribution table in a link detection packet received by link n into column n in the TMI distribution table. When link state_TME & link state_SE1=0, which indicates the inaccessibility from the TMI to the SE 1, the TMI writes m bit 0 into column n in the TMI distribution table shown in FIG. 12. The link state_SE1 indicates the link state from the TMI to the SE 1 carried by a link detection packet that is received by the TME from link n. The link state_SE1=1 indicates that SE 1 can receive packets from the TMI correctly and link state_SE1=0 indicates the reverse condition. The link state_TME indicates the link state of link n in a link state register of the TME. The link state_TME=1 indicates that the TME can receive packets from SE 3 correctly and the link state_TME=0 indicates the reverse condition.

Step 611: The TMI automatically sidesteps an invalid link to distribute packets according to the TMI distribution table. When distributing packets, the TMI first reads a row of data in the TMI distribution table by taking the TME ID in the packet header as the address, and then distributes packets to a link with the value 1 on the row. The first level SE 1 receives packets from the TMI and then distributes packets to the mid-level SE 2. The process of the first level SE 1 to distribute packets is similar to the process of the TMI to distribute packets. The first level SE 1 first reads a row of data in the SE 1 distribution table by taking the TME ID in the packet header as the address, and then distributes packets uniformly to a link with the value 1 on the row.

In an embodiment of the present invention, because an upper level packet distribution table is maintained on the basis of the accessibility information in a lower level packet distribution table, the packets distributed from the upper level packet distribution table can be switched through the lower level packet distribution table. Therefore, the problem of blocking packets in a mid-level due to an invalid link resulting in switching failure is sidestepped.

In addition, in an embodiment of the present invention, because a packet distribution table is automatically distributed through a link detection packet, the information in the packet distribution table changes automatically when the connection relationships between TMI and SE 1, between SE 1 and SE 2, between SE 2 and SE 3, and between SE 3 and TME change, for example, the connection location of link 2 and link 3 of SE 3 is interchanged. In this case, the system automatically implements link mapping to further enhance the flexibility of system layout.

FIG. 13 shows a structure of a link state detection system provided in embodiment 3 of the present invention. The system can solve the problem of blocking a middle node due to a faulty lower level link in the multi-level SE structure. In the system, the first level SE 100 needs only to know the accessibility information of the lowest level SE 300. Therefore, the first level SE 100 can be deemed as an SE, the mid-level SE 200 as a lower level unit, and the lowest level SE 300 as the destination unit. The lowest level SE 300 notifies the mid-level SE 200 of the link state information from the lowest level SE 300 to the mid-level SE 200, so that the mid-level SE 200 acquires the accessibility information from the mid-level SE 200 to the lowest level SE 300. In addition, the mid-level SE 200 notifies the first level SE 100 of the link state information from the mid-level SE 200 to the first level SE 100 and the accessibility information from the mid-level SE 200 to the lowest level SE 300. In this case, the first level SE 100 can acquire the accessibility information from the first level SE 100 to the lowest level SE 300 based on the link state information from the mid-level SE 200 to the first level SE 100 and the accessibility information from the mid-level SE 200 to the lowest level SE 300. Therefore, the problem of blocking packets in a mid-level due to an invalid link resulting in switching failure is sidestepped.

Figure 14:
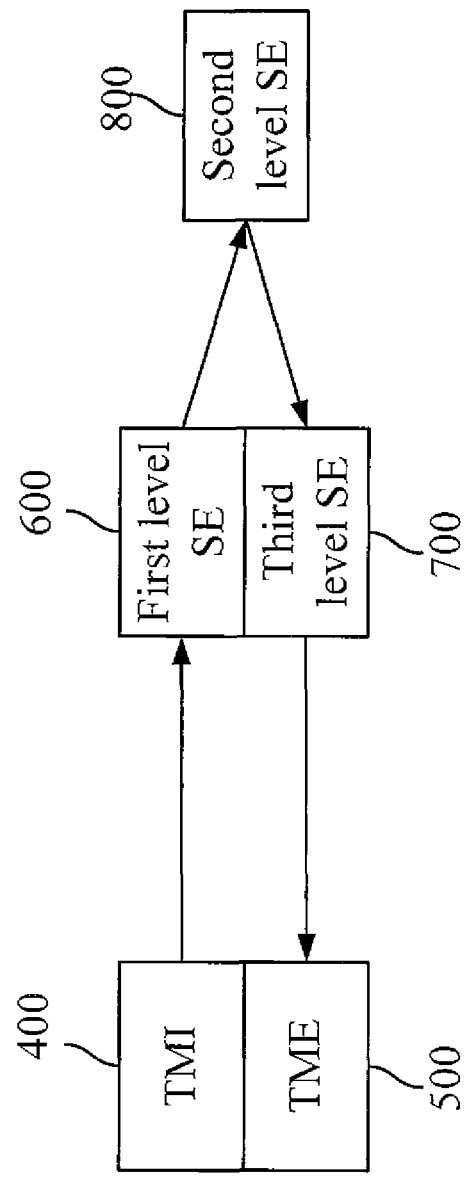
FIG. 14 shows a structure of a link state detection system provided in embodiment 4 of the present invention.

FIG. 14 shows a structure of a link state detection system provided in embodiment 4 of the present invention. The system can solve the blocking problem due to a multi-level or multi-plane condition. The system includes a TMI 400, a TME 500, a first level SE 600, a third level SE 700, and a second level SE 800. The first level SE 600, the third level SE 700, and the second level SE 800 can be deemed as SEs. Such an SE is configured to receive the link state information from the SE to the TME 500, which is detected by the TME 500, acquire the accessibility information from the SE to the TME 500, and detect the state of a link to the SE.

The second level SE 800 includes at least an SE at a level. In the embodiment, the first level SE 600 can be deemed as an SE, the TME 500 as the destination unit, the third level SE 700 and the second level SE 800 as lower level units of the first level SE 600, and the TMI 400 as an upper-level unit of the first level SE 600. The TME 500 is configured to notify the third level SE 700 of the TME-ID and the link state information from TME 500 to the third level SE 700. The third level SE 700 is configured to receive the TME-ID and the link state information from the TME 500 to the third level SE 700, acquire the accessibility information from the third level SE 700 to the TME 500 based on the TME_ID and the link state information from TME 500 to the third level SE 700, and notify the second level SE 800 of the accessibility information from the third level SE 700 to the TME 500 and the link state information from the third level SE 700 to the second level SE 800. The second level SE 800 is configured to receive the accessibility information from the third level SE 700 to the TME 500 and the link state information from third level SE 700 to the second level SE 800, which is notified by the third level SE 700, acquire the accessibility information from the second level SE 800 to the TME 500 based on the accessibility information from the third level SE 700 to TME 500 and the link state information from the third level SE 700 and the second level SE 800, and notify the first level SE 600 of the accessibility information from the second level SE 800 to the TME 500 and the link state information from the second level SE 800 to the first level SE 600.

The first level SE 600 is configured to receive the accessibility information from the second level SE 800 to the TME 500 and the link state information from the second level SE 800 to the first level SE 600, which is notified by the second level SE 800, and generate a first level SE distribution table based on the accessibility information from the second level SE 800 to the TME 500 and the link state information from the second level SE 800 to the first level SE 600. The first level SE 600 can acquire the link state from the first level SE 600 to the TME 500 based on the first level SE distribution table, and notify the TMI 400 continuously of the link state information from the first level SE 600 to the TMI 400 and the accessibility information from the first level SE 600 to the TME 500. The TMI 400 is configured to generate a TMI distribution table based on the received link state information and the accessibility information from the first level SE 600 to the TME 500. The TMI 400 can acquire the link state from TMI 400 to the TME 500 according to the TMI distribution table. In addition, when distributing packets, the TMI 400 first reads a row of data in the TMI 400 distribution table by taking TME ID in the packet header as the address, and then distributes packets to a link with the value 1 on the row. The first level SE 300 receives packets from the TMI 400 and then distributes packets to the mid-level SE 500. In this case, an upper level packet distribution table is maintained on the basis of the accessibility information in a lower level packet distribution table, so the packets distributed from the upper level packet distribution table can be switched through the lower level packet distribution table. Therefore, the problem of blocking packets in a mid-level due to an invalid link resulting in switching failure is sidestepped.

Figure 15:
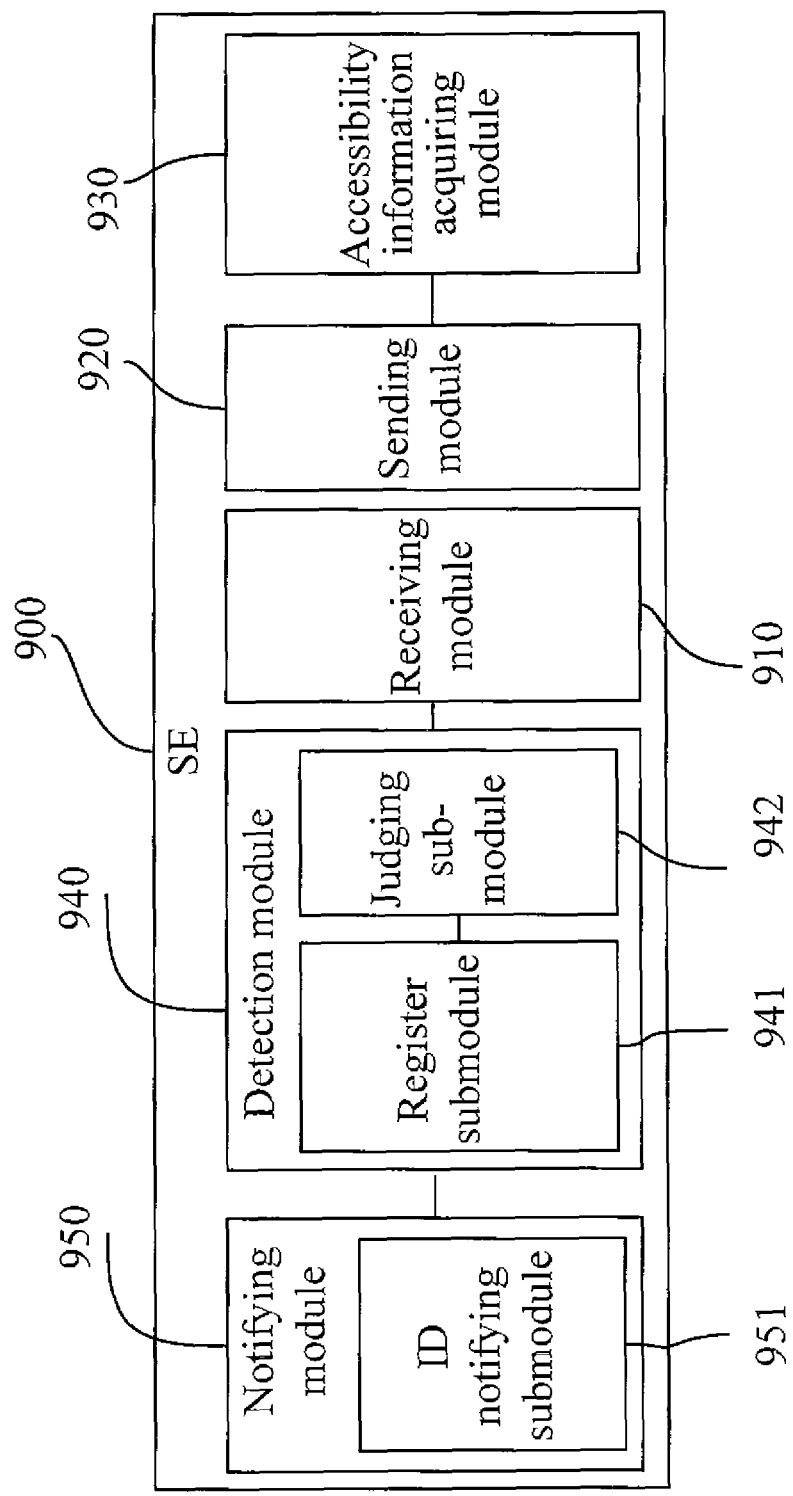
FIG. 15 shows a structure of a switching unit provided in an embodiment of the present invention.

FIG. 15 shows a structure of an SE provided in an embodiment of the present invention. The SE 900 includes:

a receiving module 910, configured to receive data that includes the link state information from the receiving module 90 to the lower level unit and the accessibility information from the lower level unit to the destination unit, which is detected by the lower level unit;

a sending module 920, configured to send data; and an accessibility information acquiring module 930, configured to acquire the accessibility information from the sending module to the destination unit based on the link state information from the sending module 920 to the lower level unit and the accessibility information from the lower level unit to the destination unit.

The SE 900 also includes:

a detecting module 940, configured to detect the link state information from the upper-level unit to the receiving module 910; and a notifying module 950, configured to notify an upper-level unit of the link state information from the upper-level unit to the receiving module 910, which is detected by the detecting module 940, and the accessibility information from the sending module 320 to the destination unit, which is acquired by the accessibility information acquiring module 930.

The detecting module 940 includes:

a register sub-module 941, configured to record the link state information of the receiving module 910, where each bit in the register sub-module 941 corresponds to a link to the receiving module 910; and a judging sub-module 942, configured to determine the state of a link by judging whether the receiving module 910 can receive packets from an upper-level unit correctly, where if the receiving module receives packets from the upper-level unit, the link to receive packets is in the normal state; otherwise, the link is in the abnormal state.

Specifically, the notifying module 950 can be a link detection packet sending module and is configured to send link detection packets to an upper-level unit. The link detection packet carries the link state information from the upper-level unit to the receiving unit 10, which is detected by the detecting module 940, and the accessibility information from the sending module 920 to the destination unit, which is acquired by the accessibility information acquiring module 930.

The notifying module 950 includes an ID notifying sub-module 951, which is configured to notify an upper-level unit of the SE-ID of the sub-module 951 when the SE 900 serves as the lowest level SE.

Figure 16:
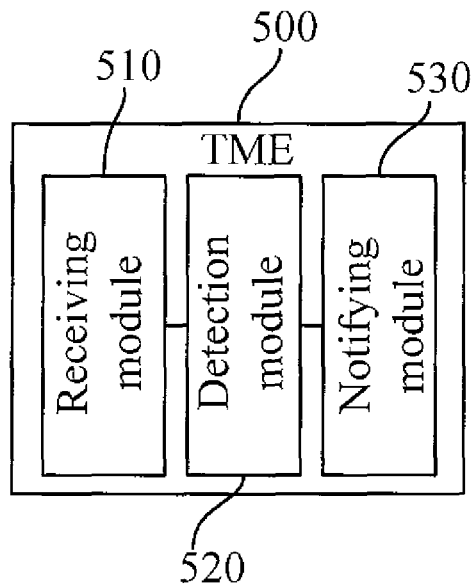
FIG. 16 shows a structure of a TME provided in an embodiment of the present invention.

FIG. 16 shows a structure of a TME provided in an embodiment of the present invention. The TME 500 includes:

a receiving module 510, configured to receive the data from a lowest level SE;

a detecting module 520, configured to detect the link state information from the lowest level SE to the receiving module 510; and a notifying module 530, configured to notify the lowest level SE of the link state information, which is detected by the detecting module 520, from the lowest level SE to the receiving module 510 and TME-ID of the TME 500.

Figure 17:
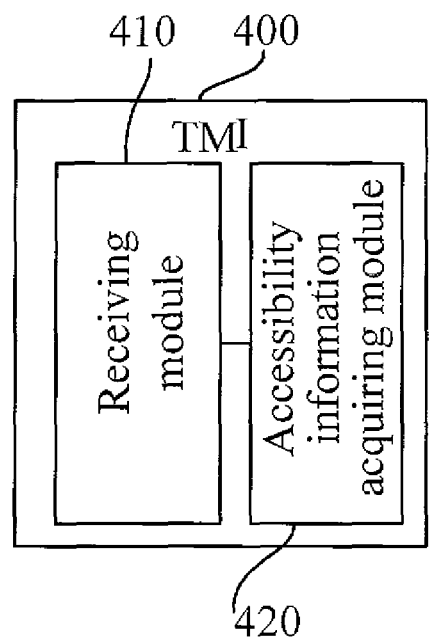
FIG. 17 shows a structure of a TMI provided in an embodiment of the present invention.

FIG. 17 shows the structure of a TMI provided in an embodiment of the present invention. The TMI 400 includes:

a receiving module 410, configured to receive the link state information, which is sent by the first level SE, from the first level SE to the TMI 400 and the accessibility information from the first level SE to TME 500; and an accessibility information acquiring module 420, configured to acquire the accessibility information from the TMI 400 to the TME 500 based on the link state information from the first level SE to the TMI 400 and the accessibility information from the first level SE to the TME 500, which is acquired by the receiving module 400.

In an embodiment of the present invention, the packet distribution tables of the TMI and SEs at all levels are maintained to automatically sidestep the problem of blocking packets in a mid-level due to a faulty link when the TMI and SEs at all levels distribute packets, thus implementing the automatic detection function of link state of a multi-level multi-plane switching network.

The preceding description of embodiments makes it clear to those skilled in the art that the present invention can be implemented either by hardware or by software on a necessary universal hardware platform. This means the technical solution provided by the present invention can be implemented by a software product. The storage mediums of the software product may be a CD-ROM, USB disk, mobile hard disk, or another non-volatile medium. The software product includes several commands to direct a computer (a PC, server, or network device) to execute the methods provided by the embodiments of the present invention.

To sum up, the foregoing description is only some exemplary embodiments of the present invention and is not for use in limiting the protection scope thereof. All the modifications, equivalent replacements, and improvements made by those skilled in the art without departing from the spirit and principle of the invention are protected by the present invention.

What is claimed is:

1. A link state detection method comprising:
    obtaining, by a lowest level switching element (SE), first link state information from the lowest level SE to a mid-level SE;
    notifying to the mid-level SE, by the lowest level SE, the first link state information;
    obtaining, by the mid-level SE, first accessibility information from the mid-level SE to the lowest level SE according to the first link state information and obtaining second link state information from the mid-level SE to a first level SE;
    notifying to the first level SE, by the mid-level SE, the second link state information and the first accessibility information;
    obtaining, by the first level SE, second accessibility information from the first level SE to the lowest level SE according to the second link state information and the first accessibility information sent by the mid-level SE; and wherein notifying to the mid-level SE, by the lowest level SE, the first link state information comprises:
sending the first link state information from the lowest level SE to the first level SE through an internal bus between the lowest level SE and the first level SE or through an external bus between the lowest level SE and the first level SE, and
sending the received first link state information from the first level SE to the mid-level SE.

2. The method according to claim 1, wherein the method further comprises:
generating a distribution table according to the first and second accessibility information.

3. The method according to claim 1, wherein the step of obtaining the first link state information comprises:
determining whether a receiving link between the lower level SE and the mid-level SE is normal according to accuracy of packets sent by the mid-level SE.

4. The method according to claim 1, wherein the method further comprises:
notifying, by the lowest level SE, a switching element-ID (SE-ID) of the lowest level SE to the mid-level SE, wherein the first accessibility information from the mid-level SE to the lowest level SE is obtained according to association of the first link state information and the SE-ID of the lowest level SE.

5. The method according to claim 1, wherein the method further comprises:
notifying, by the mid-level SE, a switching element-ID (SE-ID) of the mid-level SE to the first level SE, wherein the second accessibility information from the first-level SE to the mid-level SE is obtained according to association of the second link state information and the SE-ID of the mid-level SE.

6. The method according to claim 1, wherein the notifying to the mid-level SE the first link state information comprises:
notifying to the mid-level SE, by the lowest level SE, a link detection packet carrying the first link state information.

7. The method according to claim 1, wherein the notifying to the mid-level SE the first link state information comprises:
sending, by the first level SE, the first link state information to the mid-level SE through a downlink.

8. The method according to claim 1, wherein the notifying to the first level SE the second link state information and the first accessibility information comprises:
notifying to the first level SE, by the mid-level SE, a link detection packet carrying the second link state information and the first accessibility information.

9. A link state detection method, comprising:
detecting, by a traffic manager egress (TME), a state of a link from the TME to a lowest level switching element (SE) of a SE, and sending corresponding first link state information to the lowest level SE;
obtaining, by the lowest level SE, first accessibility information from a first level SE to the lowest level SE and obtaining second accessibility information from the first level SE to the TME according to the first link state information sent by the TME and the first accessibility information;
detecting and obtaining, by the first level SE, second link state information from the first level SE to a traffic manager ingress (TMI);
sending to the TMI, by the first level SE, the second accessibility information and the second link state information; and
obtaining, by the TMI, third accessibility information from the TMI to the TME, according to the second accessibility information and the second link state information sent by the first level SE.

10. The method according to claim 9, wherein the first link state information sent by the TME is carried by a link detection packet sent to the lowest level SE.

11. The method according to claim 9, wherein the step of sending corresponding first link state information to the lowest level SE comprises:
transmitting to the TMI, by the TME, a link detection packet including the first link state information through a bus in a chip, wherein the TME and TMI are both in the chip;
transmitting, by the TMI, the link detection packet to the first level SE through a down link; and
transmitting, by the first level SE, the first link state information to the lowest level SE.

12. A link state detection system, comprising:
a traffic manager egress (TME), configured to obtain first link state information from the TME to a switching element (SE);
wherein the SE is configured to receive the first link state information from the TME, acquire first accessibility information from the SE to the TME according to the received first link state information, and obtain second link state information from the SE to a traffic manager ingress (TMI);
wherein the TMI is configured to receive the first accessibility information from the SE and the second link state information from the SE, and acquire second accessibility information from the TMI to the TME based on the received first accessibility information and the received second link state information;
wherein the SE comprises a lowest level SE configured to acquire the first accessibility information from the lowest level SE to the TME according to the first link state information sent by the TME, acquire third link state information from the lowest level SE to a mid-level SE, and transmit the first accessibility information and the third link state information to the mid-level SE;
wherein the mid-level SE is configured to obtain third accessibility information from the mid-level SE to the TME according to the received first accessibility information and received third link state information sent by the lowest level SE, acquire fourth link state information from the mid-level SE to a first level SE, and transmit the third accessibility information and the fourth link state information SE to the first level SE; and
wherein the first level SE is configured to obtain fourth accessibility information from the first level SE to the TME according to the third accessibility information and fourth link state information sent by the mid-level SE, acquire fifth link state information from the first level SE to the TMI, and transmit the fourth accessibility information and the fifth link state information to the TMI.

13. The system according to claim 12, wherein each of the SE and the TMI keeps a distribution table therein for storing accessibility information.

14. A switching element (SE), comprising:
a lowest level SE configured to acquire first accessibility information from the lowest level SE to a traffic manager egress (TME) according to first link state information sent by the TME, acquire second link state information from the lowest level SE to a mid-level SE, and transmit the first accessibility information and the second link state information to the mid-level SE;

wherein the mid-level SE is configured to obtain second accessibility information from the mid-level SE to the TME according to the received first accessibility information and received second link state information sent by the lowest level SE, acquire third link state information from the mid-level SE to a first level SE, and transmit the second accessibility information and the third link state information to the first level SE; and wherein the first level SE is configured to obtain third accessibility information from the first level SE to the TME according to the received second accessibility information and received third link state information sent by the mid-level SE, acquire fourth link state information from the first level SE to a traffic manager ingress (TMI), and transmit the third accessibility information and the fourth link state information to the TMI.

15. The system according to claim 14, wherein each of the lowest level SE, the mid-level SE, the first level SE and the TMI keeps a distribution table therein for storing accessibility information.

* * * * *